(12) United States Patent
Koga

(10) Patent No.: US 6,980,329 B2
(45) Date of Patent: Dec. 27, 2005

(54) IMAGE PROCESSING APPARATUS AND IMAGE FORMING APPARATUS

(75) Inventor: Mikio Koga, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 898 days.

(21) Appl. No.: 09/779,521

(22) Filed: Feb. 9, 2001

(65) Prior Publication Data

US 2002/0033956 A1 Mar. 21, 2002

(30) Foreign Application Priority Data

Sep. 20, 2000 (JP) .............................. 2000-285917

(51) Int. Cl.[7] ........................ G06K 15/00; H04N 1/40; H04N 1/403; H04N 1/405
(52) U.S. Cl. ...................... 358/2.1; 358/1.9; 358/2.99; 358/3.06
(58) Field of Search ............... 358/1.9, 3.23, 358/3.24, 3.27, 524, 1.18, 1.19, 3.08; 382/182, 382/190, 205, 209, 216

(56) References Cited

U.S. PATENT DOCUMENTS 5,237,646 A * 8/1993 Bunce ...................... 358/1.18
5,282,059 A * 1/1994 Fukushima et al. ........ 358/3.08
6,438,273 B1 * 8/2002 Loce et al. ................. 382/296
6,775,410 B1 * 8/2004 Loce et al. ................. 382/209

FOREIGN PATENT DOCUMENTS

JP 60-144882 7/1985

* cited by examiner

Primary Examiner—Thomas D. Lee
Assistant Examiner—James A. Thompson
(74) Attorney, Agent, or Firm—Westerman, Hattori, Daniels & Adrian, LLP

(57) ABSTRACT

The image processing equipment produces an image of enhanced quality, having dots with higher density than in an original image, by collating an original image with templates. The present invention reduces required number of templates. Original image data in a collation window is either mirror-converted, flip-converted or flip-and-mirror-converted in an array converter (33) and selected on a time-division basis to collate with a single template pattern (34). The effect is equivalent to the collation with maximum four templates. Thus the number of template patterns to be prepared is greatly reduced. Also, by preparing additional patterns to be stored into an area that became vacant attributed to the reduction of patterns, more sophisticated image enhancement may be attained.

7 Claims, 15 Drawing Sheets

IMAGE PROCESSING APPARATUS AND IMAGE FORMING APPARATUS

BACKGROUND OF THE INVENTION

1. Field of the Invention

The present invention relates to an image processing apparatus for generating a high quality image from a low density original image received from a host computer by eliminating step-shaped jaggy lines and the like, and image forming apparatus using the image processing apparatus.

2. Description of the Related Art

In recent years, it is desired to output clear and sophisticated images. An output device such as a printer has been improved to print out high-resolution images. It is therefore required to output a high-density image from an original low-density image received from a host. For this purpose, technologies for enhancing image quality is widely applied in image processing equipment. Particularly, so-called smoothing function that eliminates step-shaped jagged lines included in low-density letters or line drawings has been introduced.

FIG. 19 shows a configuration of conventional image processing equipment. In FIG. 20, an illustrative chart of image processing is shown. As shown in FIG. 19, a window pattern having M×N dots is extracted from a binary image data expanded to a bitmap data to a window register 91 for collation. Characteristics of contours in a letter or a line drawing are extracted while this window pattern is collated to a predetermined collation pattern group 93. From the obtained characteristics in a contour, a dot converter 94 corrects a pixel of interest to enhance image quality on a dot bases. There is provided a pattern collation controller 92 for controlling pattern collation operation.

Thus, a 300 dpi image having step-shaped contours is converted into a 1200 dpi image having smooth contours by means of dot interpolation. In order to extract characteristics in this contour part, collation patterns are provided corresponding to respective contour patterns, facilitating to extract contour characteristics. According to this pattern collation method, however, it is required to prepare greater number of template (collation) patterns in order to obtain greater image enhancement effect.

To satisfy recent demand for higher quality images, it is required to output a smooth image by extracting characteristics of contour pattern very precisely. For example, contour characteristics in a circle as well as a slant line must be extracted. In conventional pattern collation method, it is required the number of collation patterns or collation circuits being as much as the number of contour patterns to be extracted. This requires large number of collation patterns or collation circuits to be prepared, which makes it difficult to realize low-cost image processing equipment for producing high quality images.

If, on the other hand, the number of collation patterns is restricted, the precise extraction of contour characteristics is degraded, which makes it difficult to obtain high quality images.

SUMMARY OF THE INVENTION

Accordingly, it is an object of the present invention to provide an image processing apparatus and image forming apparatus that realizes high quality images by extracting contour characteristics precisely using the reduced number of collation patterns.

It is another object of the invention to provide an image processing apparatus and image forming apparatus producing high quality images with low cost.

It is still another object of the invention to provide an image processing apparatus and image forming apparatus in which the reduction of collation speed is avoided even under the reduced number of collation patterns.

To attain the above objects, an image processing apparatus according to the present invention has functions of; extracting a window pattern having M×N dots (hereinafter referred to as M×N window) from an image data having been expanded to a bitmap data; collating the window pattern with a group of predetermined collation patterns; extracting contour characteristics of the image; and conducting dot correction. The image processing apparatus includes; a window array conversion means to convert the array of the output data of the M×N window extracted from the image data; a pattern collation means to collate the array conversion data obtained from the array conversion means with a group of templates respectively consisting of single-directional reference patterns; and a pattern collation control means for switching, on a time-division basis, a plurality of array conversion data obtained from an output data of a collation window through the window array conversion means to collate for a plurality of times the single-directional reference pattern groups with the array conversion data.

According to the present invention, an image data of collation window is converted using mirror-conversion, flip-conversion, and mirror-and-flip conversion and the converted image data is selected on a time-division basis, to collate with a single template pattern. With this method, an effect identical to the case using four (4) templates in maximum, bringing about the reduction of template patterns. By adding new patterns in a memory area that became vacant because of the above-mentioned reduction of patterns, image enhancement having more precise quality can be obtained.

Also, preferably, the pattern collation control means switches the selection of the array conversion means according to logic combination of mark dots and space dots consisting of the dot of interest and its right and left neighboring dots.

Further, preferably, the pattern collation control means collects a center dot from M×N dot array in a window extracted from image data as the current dot of interest, together with the right and left dots neighboring the current dot of interest along with a direction of image extraction, which is a direction of image data collation.

Still further, in regard to the combinations of the current dot of interest and its right and left neighboring dots, the pattern collation means provides template groups categorized to; (a) a 'continuous pattern' consisting of the three dots entirely having mark, or else space; (b) an 'discontinuous mark pattern' consisting of the current dot of interest having mark, excluding the case (a); and, (c) an 'discontinuous space pattern' consisting of the current dot of interest having space, excluding the case (a).

Still further, in regard to the combination of the current dot of interest and its right and left neighboring dots, the pattern collation controller starts collation with; the template group corresponding to the continuous pattern when the current dot of interest and its right and left neighboring dots in the window output data entirely have mark, or else space; the template group of discontinuous mark pattern when the current dot of interest has mark and at least either the right or left neighboring dot has space; and the template group of discontinuous space pattern when the current dot of interest has space and at least either the right or left neighboring dot has mark.

According to this example of the present invention, it is assumed that a pattern collation processing time for the above discontinuous collation pattern groups is at least twice as long as the time for a continuous pattern collation. Accordingly, even in case fast pattern collation is required in such high speed that only a single collation time can be assigned per collation cycle, a plurality of pattern collations can be carried out in the collation cycle, using template patterns obtained from a single template pattern through an array conversion means.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings, wherein like numerals or symbols refer to like parts.

An embodiment of image forming equipment according to the invention is described hereafter, taking as an example an electro-photographic printer using electro-photographic method. The present invention, however, can also be applied to other image forming equipment, such as display equipment.

[First Embodiment]

Figure 1:
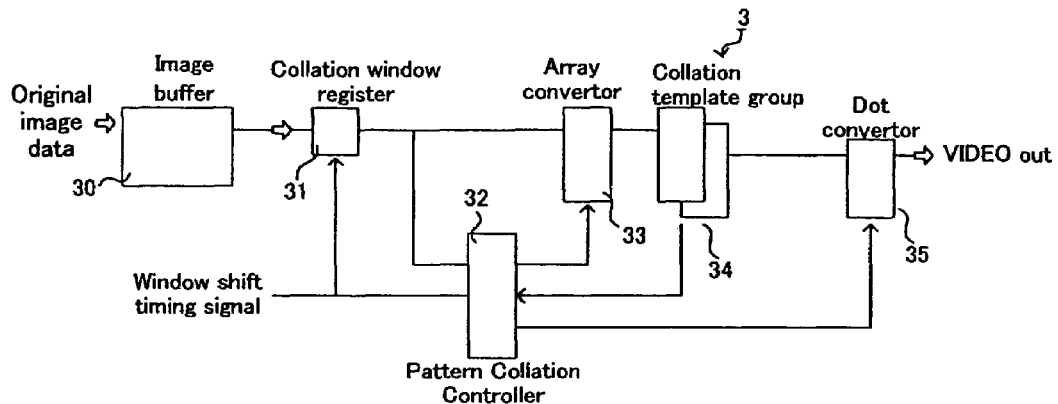
FIG. 1 shows a configuration diagram of an embodiment of image processing equipment in accordance with the present invention.
Figure 2:
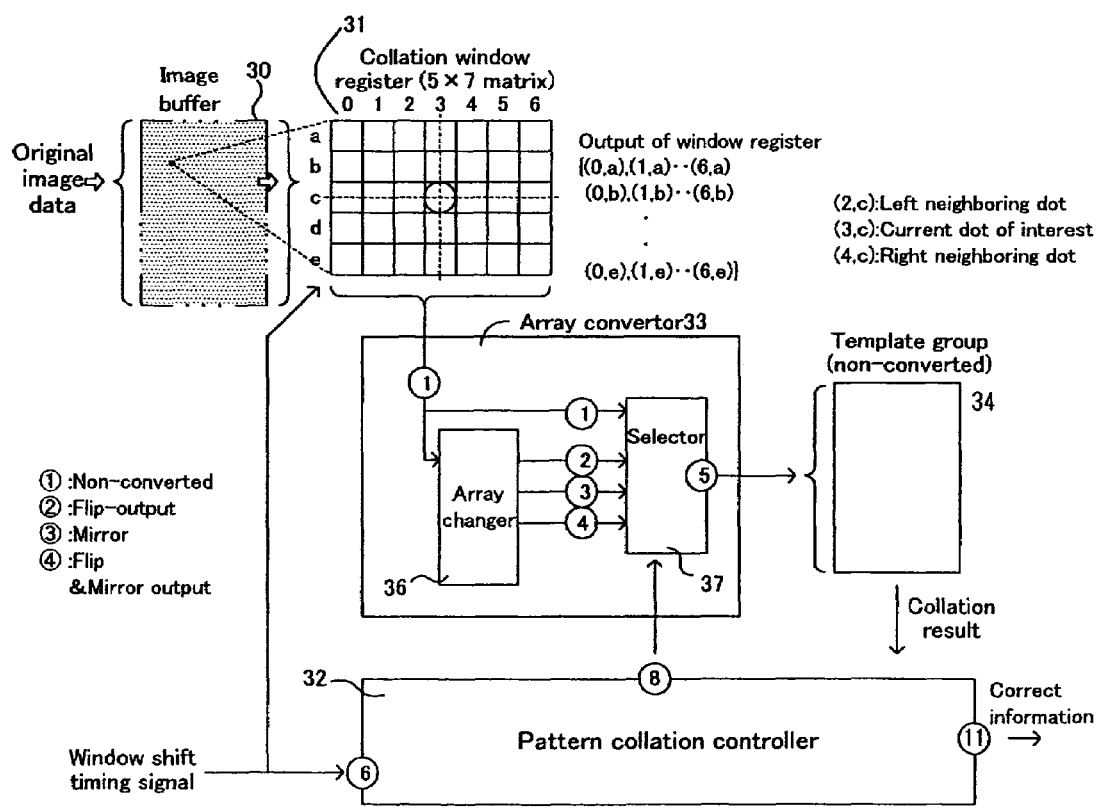
FIG. 2 shows a block diagram of a major part in accordance with the first embodiment shown in FIG. 1.
Figure 3:
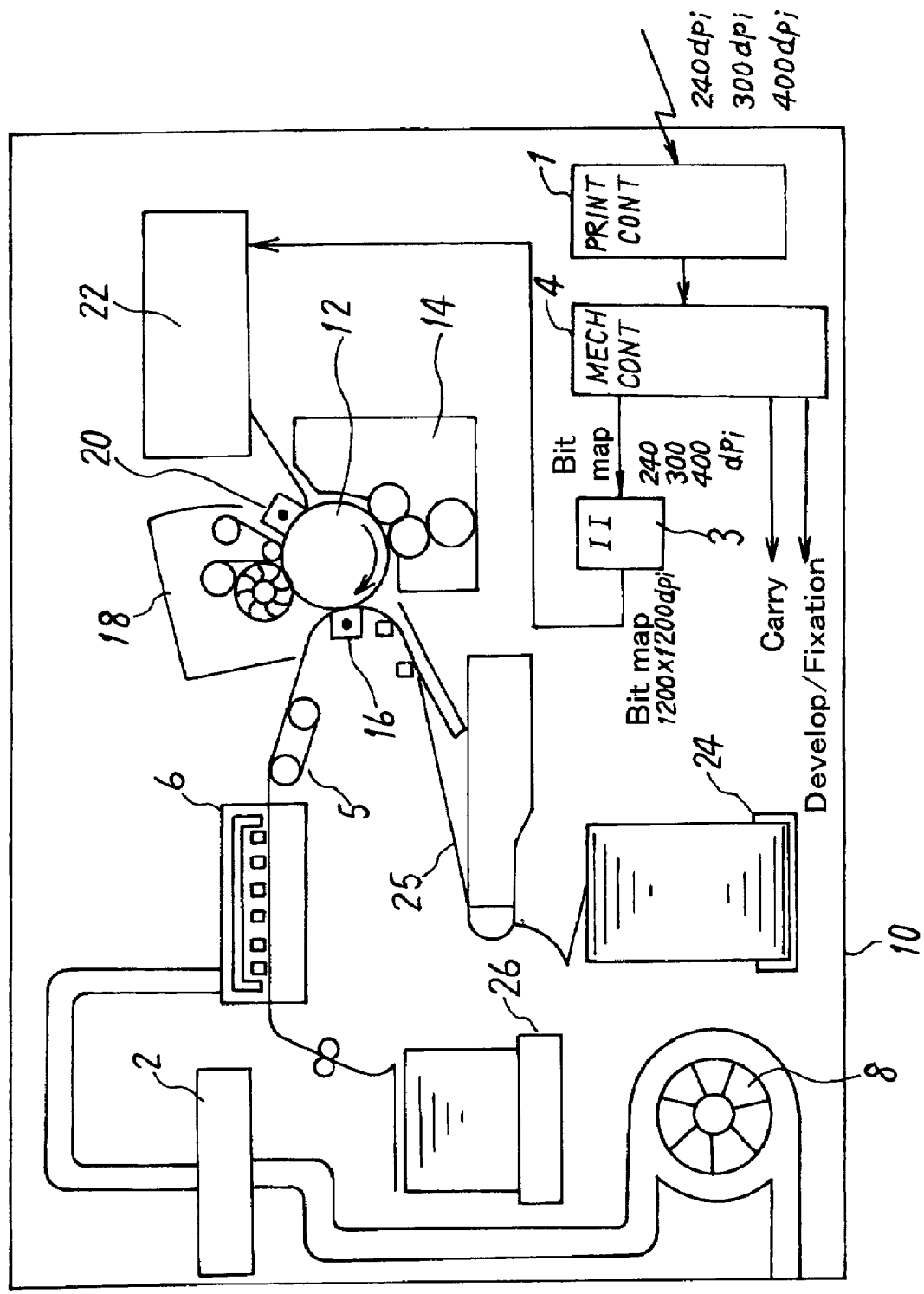
FIG. 3 shows a configuration diagram of image forming equipment applying the image processing equipment shown in FIG. 1.
Figure 4:
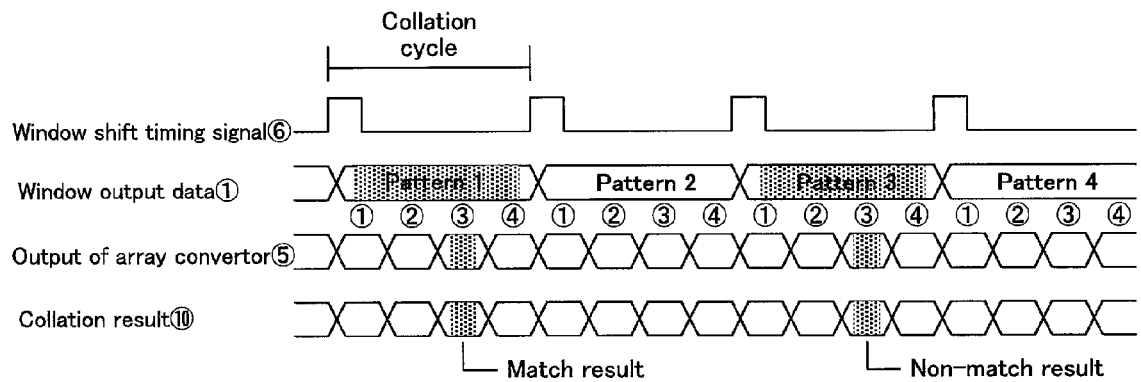
FIG. 4 shows an operation time chart of the configuration shown in FIG. 2.
Figure 5:
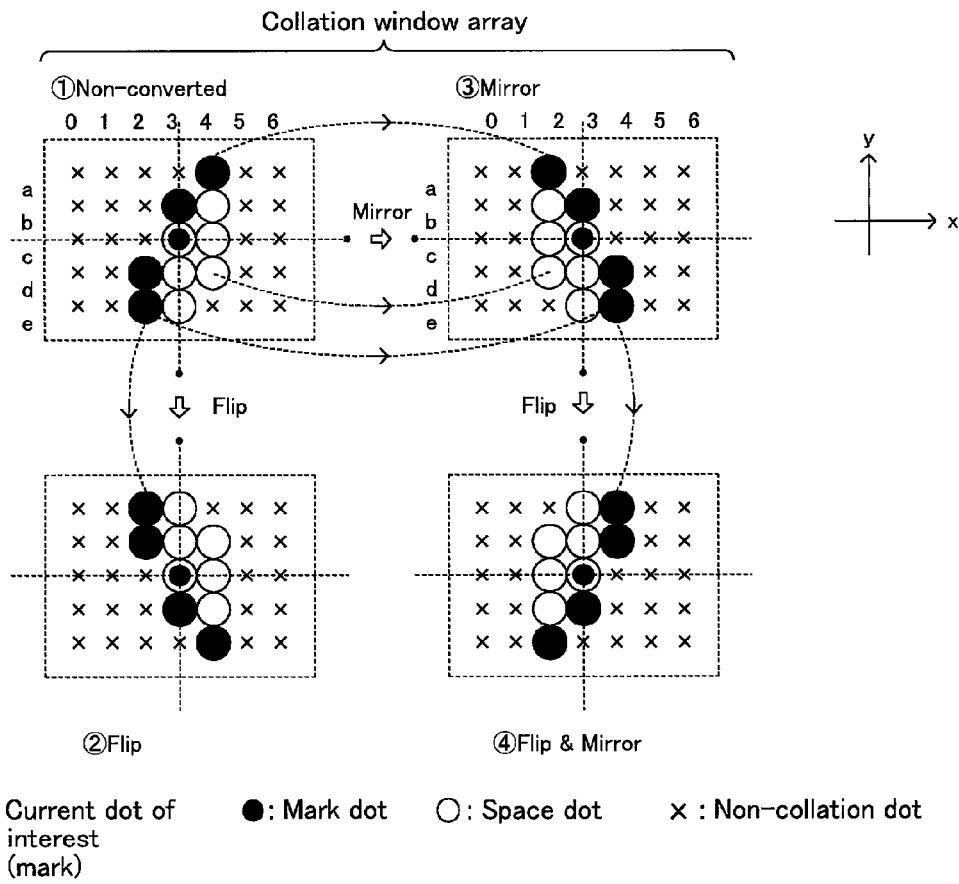
FIG. 5 shows a chart illustrating array converter shown in FIG. 2.

In FIG. 1, there is shown an overall block diagram of image processing equipment as an embodiment of the present invention. Also, FIG. 2 is a major part of image processing equipment according to the first embodiment of the present invention. FIG. 3 is a configuration diagram of image forming equipment applying the image processing equipment shown in FIG. 1. FIG. 4 is an operation time chart of the configuration shown in FIG. 2. FIG. 5 is an array converter shown in FIG. 2. FIG. 6 is an example of modifying a jaggy image using image processing shown in FIG. 2.

Before explaining an image processing circuit 3 shown in FIG. 1, an electro-photographic printer 10 applying image processing circuit 3 shown in FIG. 1 is explained, using FIG. 3. As shown in FIG. 3, a main body of printer 10 consists of an electro-photographic mechanism. An image is exposed onto a photosensitive drum 12 by a laser exposure device 22 after electrified by charging device 20, to produce an electrostatic latent image on the photosensitive drum 12. A developing device 14 supplies two-component developers to the photosensitive drum 12 to develop the electrostatic latent image to produce a toner image. A transfer device 16 transfers the toner image on the photosensitive drum 12 onto a sheet 25. A cleaning mechanism 18 eliminates charges on photosensitive drum 12 after transfer, and also removes residual toners.

A sheet 25 consisting of continuous pages is stacked on a hopper 24. Sheet 25 on hopper 24 is led by carrying mechanism 5 to a transposition point, then is housed in a stacker 26 through flush fixation device 6. Flush fixation device 6 fixes the toner image on sheet 25 by a flush light.

This printer 10 is capable of printing at high speed, for example more than 100 sheets per minute. This produces large amount of sublimed component. A filter 2 and an exhaust fan 8 are provided for eliminating the sublimed component.

As photosensitive member 12, an inorganic photosensitive member such as amorphous silicon and selenium, or an organic photosensitive member such as poly-silane and phthalocyanine may be used. From the viewpoint of lifetime, amorphous silicon photosensitive member is desirable.

In printer 10, there are provided a printer controller 1, a mechanical controller 4 and an image processing circuit 3. Printer controller 1 analyzes a command sent from a non-illustrated host to generate an internal command and print data (bitmap data). Mechanical controller 4 controls carrying mechanism 5 and development/fixation mechanisms 14, 16 and 6 according to the internal command. Further, mechanical controller 4 outputs print data to the image processing circuit 3.

As described below, the image processing circuit 3 processes bitmap data having low density (e.g. 240 dpi, 300 dpi or 400 dpi) to generate bitmap data having high density (e.g.

1200 dpi), then to drive laser exposure device 22. Thus a high-density image that is dot-corrected low-density image data is produced on sheet 25.

Referring to FIGS. 1 and 2, a configuration of image processing circuit 3 is illustrated. As shown in FIGS. 1 and 2, an image buffer 30 stacks low-density original image data transmitted from a host to the image forming equipment. A window register 31 stores 5×7 dot collated data (0,a)–(6,e). A pattern collation controller 32 extracts 5×1 dots (5 rows and 1 column) on each window shift timing signal ⑥ for deciding collation cycle, to forward to window register 31 for collation located in a succeeding stage. Thus entire bit data (0,a)–(6,e) output from the window register 31 are forwarded to array converter 33.

Array converter 33 includes an array substitution circuit 36 for substituting dot array of inputted window output data ① to generate data ② to ④ converted by means of flip conversion, mirror conversion, and flip & mirror conversion. Array converter 33 also includes a selector 37 for selecting one of the data ① to ④ according to a selection signal ⑧ from pattern collation controller 32, to output as collated data ⑤ to a set of template group (i.e. group of non-converted collation pattern) 34.

On receipt of window shift timing signal ⑥, pattern collation controller 32 switches selection signal ⑧ of selector 37 in array converter 33 to lead non-converted data ①, flip-converted data ②, mirror-converted data ③, flip-and-mirror-converted data ④ to template group 34, as an output signal (collation data) ⑤ of array converter 33. Template group (collation circuit) 34 simultaneously collates with output signal ⑤ in array converter 33 for whole collation patterns in the group, to send a collation result S10 back to pattern collation controller 32.

Based on this result S10 and the current dot of interest i.e. (3,c) in window register 31, pattern collation controller 32 generates dot correction information S11 against the current dot of interest. Dot converter 35 reads out high-density data corresponding to the above-mentioned dot correction information to produce video output.

FIG. 5 shows an example of non-converted data ①, flip-converted data ②, mirror-converted data ③, and flip-and-mirror-converted data ④, for explaining an operation of array converter 33. As shown in FIG. 5, the flip-converted data is produced by reversing the non-converted data ① around a horizontal x-axis. The mirror-converted data ② is produced by reversing the non-converted data ① around a vertical y-axis. Also, the flip-and-mirror-converted data ④ is produced by reversing the mirror-converted data ③ around the x-axis. Therefore, array substitution circuit 36 in array converter 33 is configured by data inverting circuits.

Now, an operation of the circuit shown in FIG. 2 is illustrated using FIG. 4. First, an original image data having low density sent from a host to an image forming equipment is stacked into image buffer 30. Pattern collation controller 32 extracts 5×1 dots (5 rows and 1 column) from image buffer 30 on each window shift timing signal ⑥ for deciding collation cycle. The extracted data is successively forwarded to collation window register 31 located in the succeeding stage. Consequently, the entire bits (0,a)–(6,e) of data ① output from register 31 are forwarded to array converter 33.

Array substitution circuit 36 in array converter 33 substitutes the input dot array of window output data ① to generate flip-converted data ②, mirror-converted data ③ and flip-mirror-converted data ④ to output to selector 37. Using selection signal ⑧ from pattern collation controller 32, selector 37 outputs one of the data ① to ④ as collation data ⑤ to a set of template group (a set of non-converted collation pattern) 34.

On receipt of window shift timing signal ⑥, pattern collation controller 32 switches selection signal ⑧ of selector 37 in array converter 33, to lead, within one collation cycle, non-converted data ①, flip-converted data ②, mirror-converted data ③ and flip-and-mirror-converted data ④, as output signal ⑤ (collation data) of array converter 33, to template group 34. Template group 34 simultaneously collates output signal ⑤ of array converter 33 with the entire collated pattern within the group, to forward the collation result S10 back to pattern collation controller 32.

Based on the current dot of interest and the collation result S10, pattern collation controller 32 generates dot correction information S11 against the current dot of interest.

In this embodiment, image data in the collation window are generated through the mirror-conversion, flip-conversion, and mirror-and-flip conversion, then is selected on a time-division basis to collate a sheet of template pattern. Therefore, the effect same as the provision of maximum 4 sheets of templates can be obtained by using only one sheet of template pattern. Thus the required number of template pattern can greatly be decreased.

This enables to add new patterns in the vacant memory area newly produced by the above method, which contributes to obtaining more sophisticated image enhancement effect.

Figure 6A:
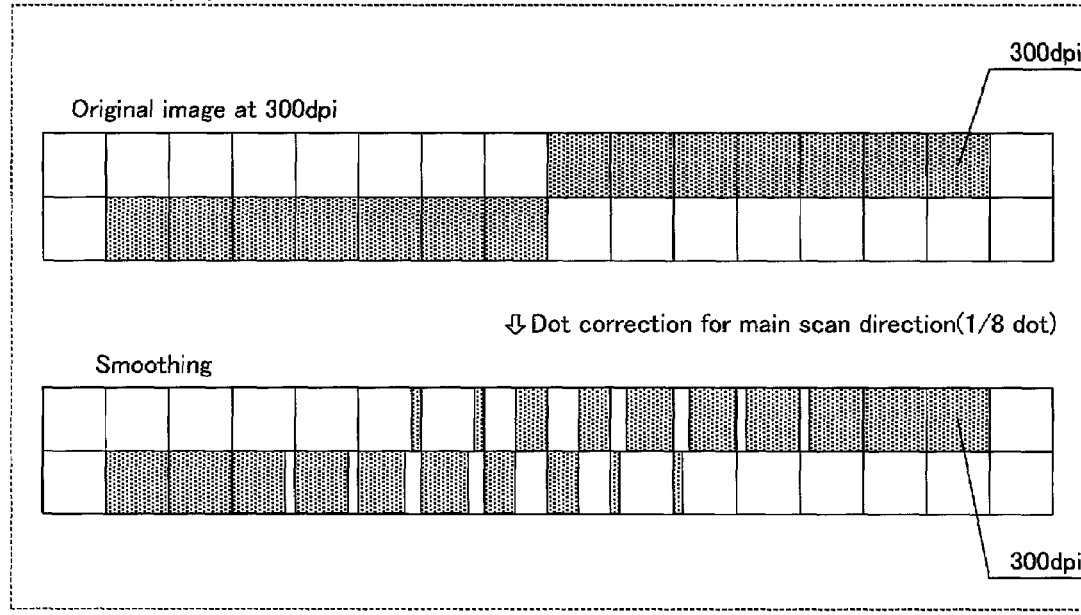
FIGS. 6(A) and 6(B) show charts illustrating an example of enhanced image quality according to the configuration shown in FIG. 1.
Figure 6B:
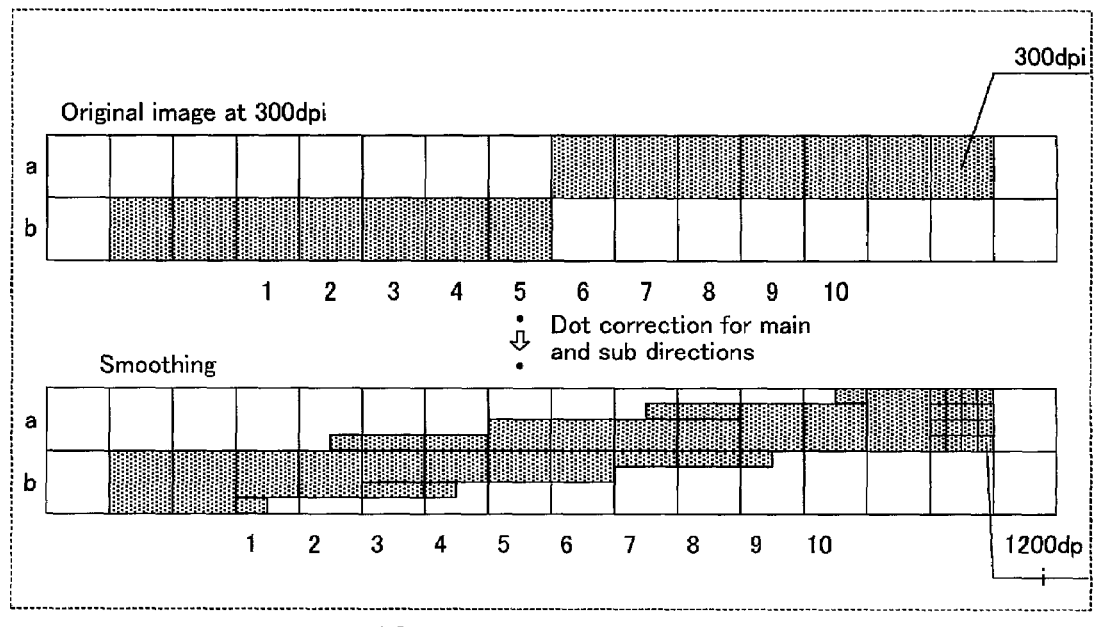
Figure 6B:

In FIG. 6(A) and FIG. 6(B), there are shown the result of such smoothing processing performed by image processing circuit 3. FIG. 6(A) shows an example of one-dimensional smoothing processing of an original image having 300 dpi in the main scanning direction. FIG. 6(B) shows another example of two-dimensional smoothing processing of an original image having 300 dpi in the main scanning and sub-scanning direction. The Dot converter 35 reads out one of the patterns b1, a1, . . . having 1200×1200 dpi shown in FIG. 6(B) from the dot correction information to output.

For example, in case 512 templates are used for extracting characteristics from contour parts of a letter or a line drawing, the number of templates required can be reduced one-forth to 128 templates. This enables to produce higher quality images with the fewer number of templates, resulting in reduction of cost.

[Second Embodiment]

According to the first embodiment shown above, there are required four (4) collation time units per collation cycle. In contrast, there may be a case in high-speed printer that high-speed pattern collation is required and only one collation time unit is allowed per collation cycle. To cope with the above case, the second embodiment explained hereafter is provided with the reduced number of template patterns using the aforementioned array converter 33.

Figure 7:
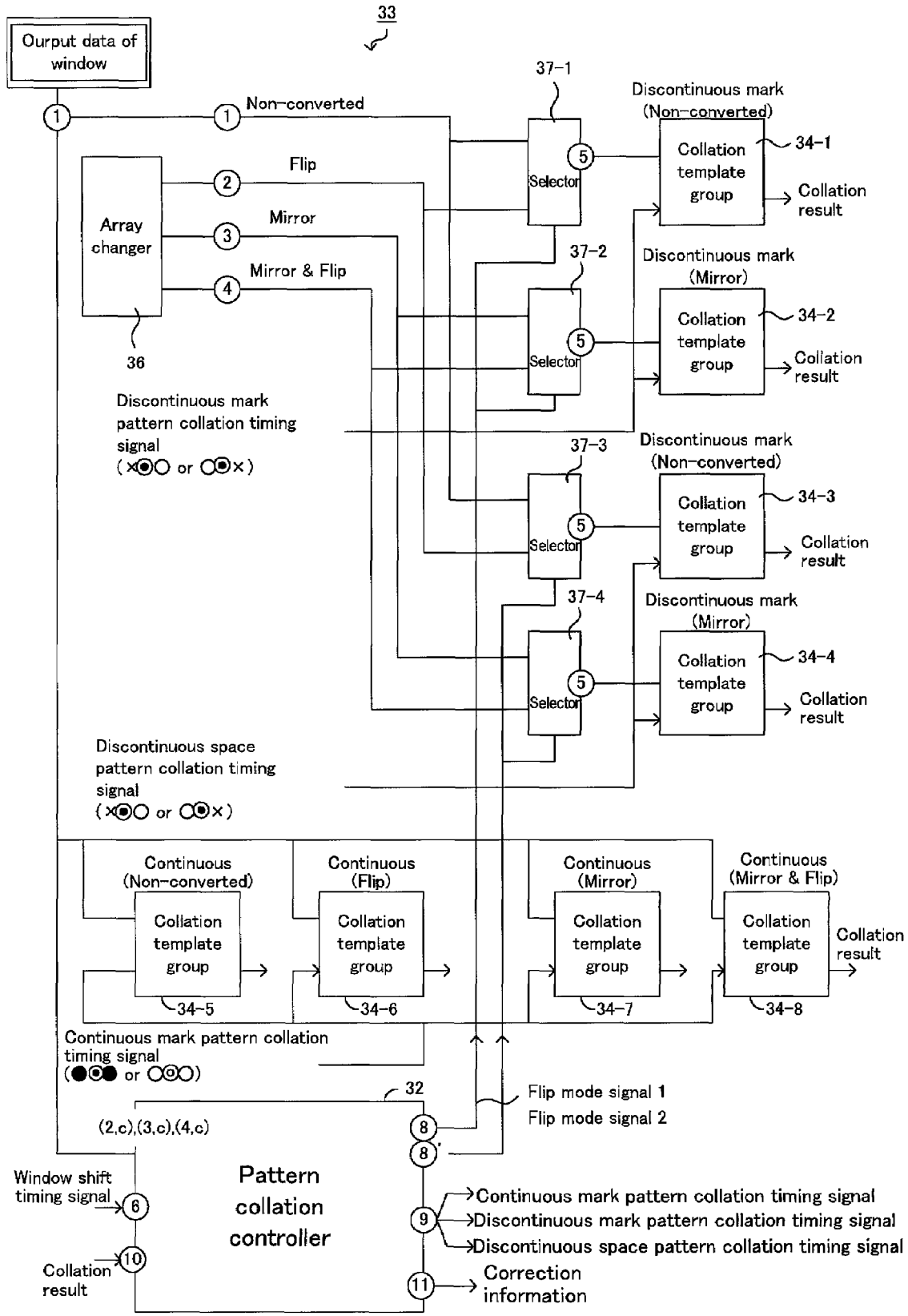
FIG. 7 shows a block diagram of a major part of the second embodiment shown in FIG. 1.
Figure 12:
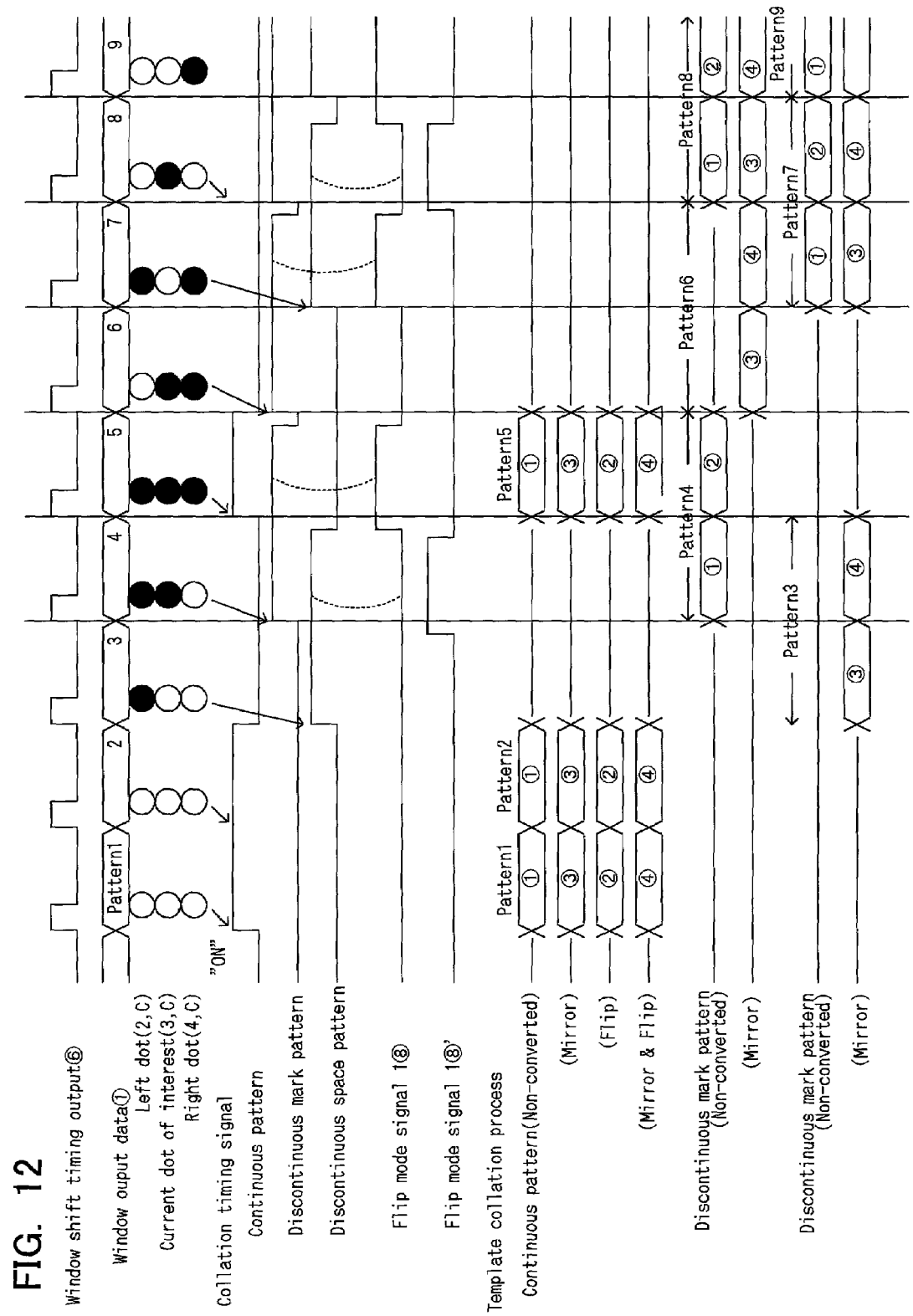
FIG. 12 shows an operation time chart of the configuration shown in FIG. 7.
Figure 13:
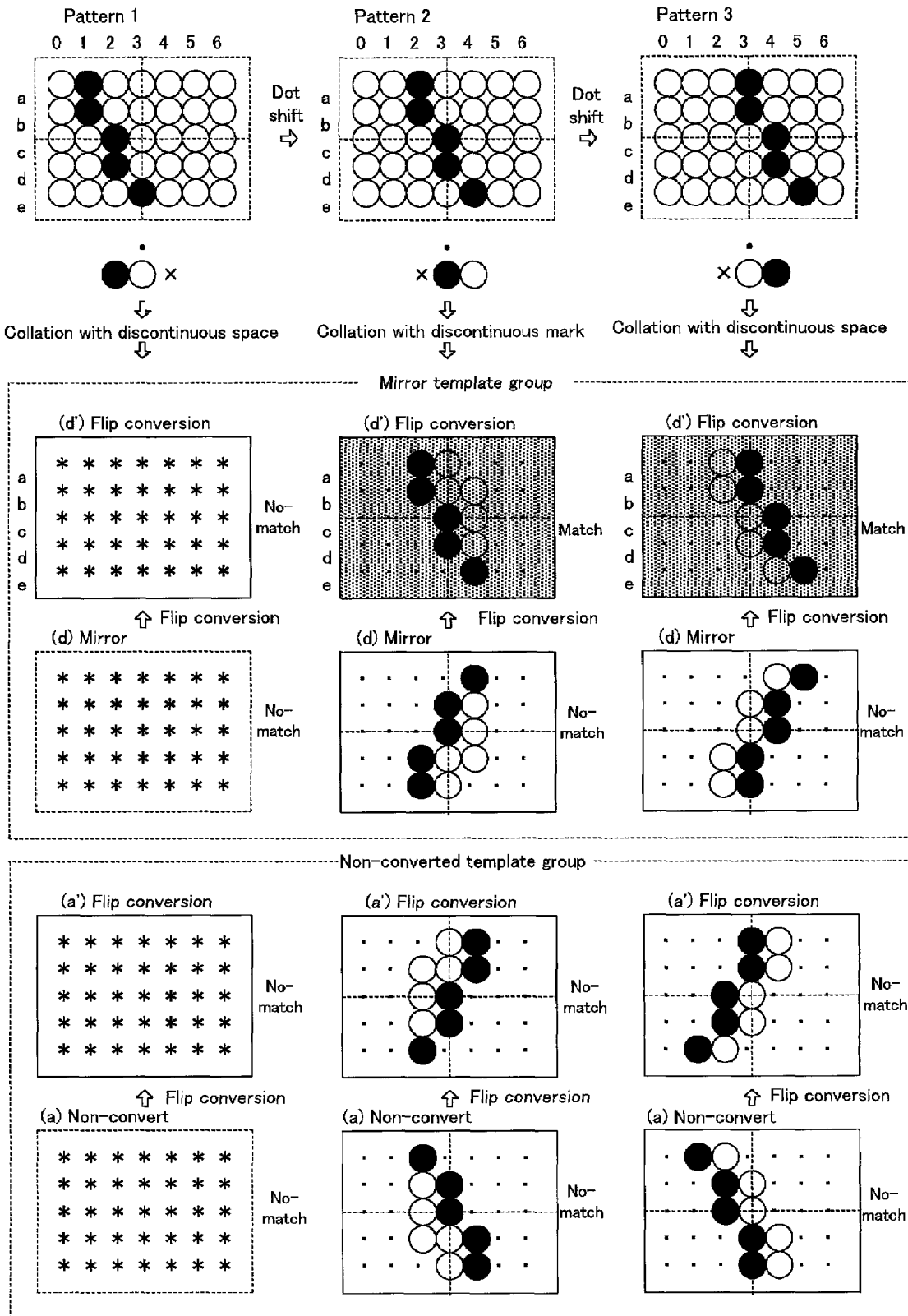
FIG. 13 shows an example of collation processing of the configuration shown in FIG. 7.

FIG. 7 shows a major part of image processing equipment in accordance with the second embodiment of the invention. FIG. 8 to FIG. 11 show illustrative charts of collation template group shown in FIG. 7. FIG. 12 shows an operation time chart of the configuration shown in FIG. 7. Also, FIG. 13 shows an illustrative chart of collation operation shown in FIG. 7.

In FIG. 7, there are shown only array converter 33 and pattern collation controller 32 and template group 34 in the configuration shown in FIGS. 1 and 2. Namely, in FIG. 7, image buffer 30, window register 31 and dot converter 35, respectively having the identical configuration to the first embodiment, are omitted.

In FIG. 7, pattern collation controller 32 extracts 5×1 dots (5 rows and 1 column) from image buffer 30 on each window shift timing signal ⑥ for deciding collation cycle, to forward to collation window register 31 located in the latter stage. Consequently, the entire bits (0,a)–(6,e) of data ① output from register 31 are forwarded to array converter 33. Also, pattern collation controller 32 reads the bit (3,c) positioned at the center of the window array in window register 31 shown in FIG. 2, and the left and right neighboring bits (2,c) and (4,c).

Collation template group 34 consists of totally 8 groups: as collation template groups for discontinuous mark and space patterns, non-conversion collation template groups 34-1 and 34-3, and collation template groups for mirror-conversion patterns 34-2 and 34-4, thus totaling 4 groups; and as collation template groups for continuous patterns, respective collation template groups for non-conversion, flip-conversion, mirror-conversion and flip-and-mirror-conversion 34-5 to 34-8, thus totaling 4 groups.

Here, collation template groups for flip-conversion and flip-and-mirror-conversion patterns are not prepared for discontinuous mark and space patterns. Instead, the corresponding function is realized by array converter 33, consisting of array substitution circuit 36 and selector 37 provided in front of respective collation template groups 34-1 to 34-4. Specifically, array substitution circuit 36 in array converter 33 substitutes a dot array of window output data ① input therein, to generate conversion data ② to ④ each resulting from flip-conversion, mirror-conversion and flip-and-mirror-conversion, to output to selector 37-1 to 37-4.

Selector 37 is configured by selectors 37-1 to 37-4 respectively connected to non-conversion collation template groups 34-1 and 34-3, and template groups for mirror-conversion pattern 34-2 and 34-4, as collation template groups for discontinuous mark and space pattern. Using selection signal ⑧ (flip-flop mode signals 1 and 2) from pattern collation controller 32, selector 37-1 outputs, as collation data ⑤, either one of data ① or ②, selector 37-1 outputs either of data ③ or ④, selector 37-3 outputs either of data ① or ②, and selector 37-4 outputs either of data ③ or ④, respectively to the corresponding template groups 34-1 to 34-4.

Triggered by each window shift timing signal ⑥, pattern collation controller 32 extracts the current dot of interest (3,c) and its left and right neighboring dots (2,c) and (4,c) from window output data ①. Depending on this combination, pattern collation controller 32 switches selection signal ⑧ of selectors 37-1 to 37-4 on a time-division basis, to lead to template groups 34-1 to 34-4 collation data ⑤ converted from window output data ① to a desired array. Also, pattern collation controller 32 outputs pattern collation timing signal ⑨ to either of template groups 34-1 to 34-8 corresponding to the above-mentioned combination (continuous pattern, discontinuous mark pattern, or discontinuous space pattern), to order the relevant template group to start collation operation.

Figure 8:
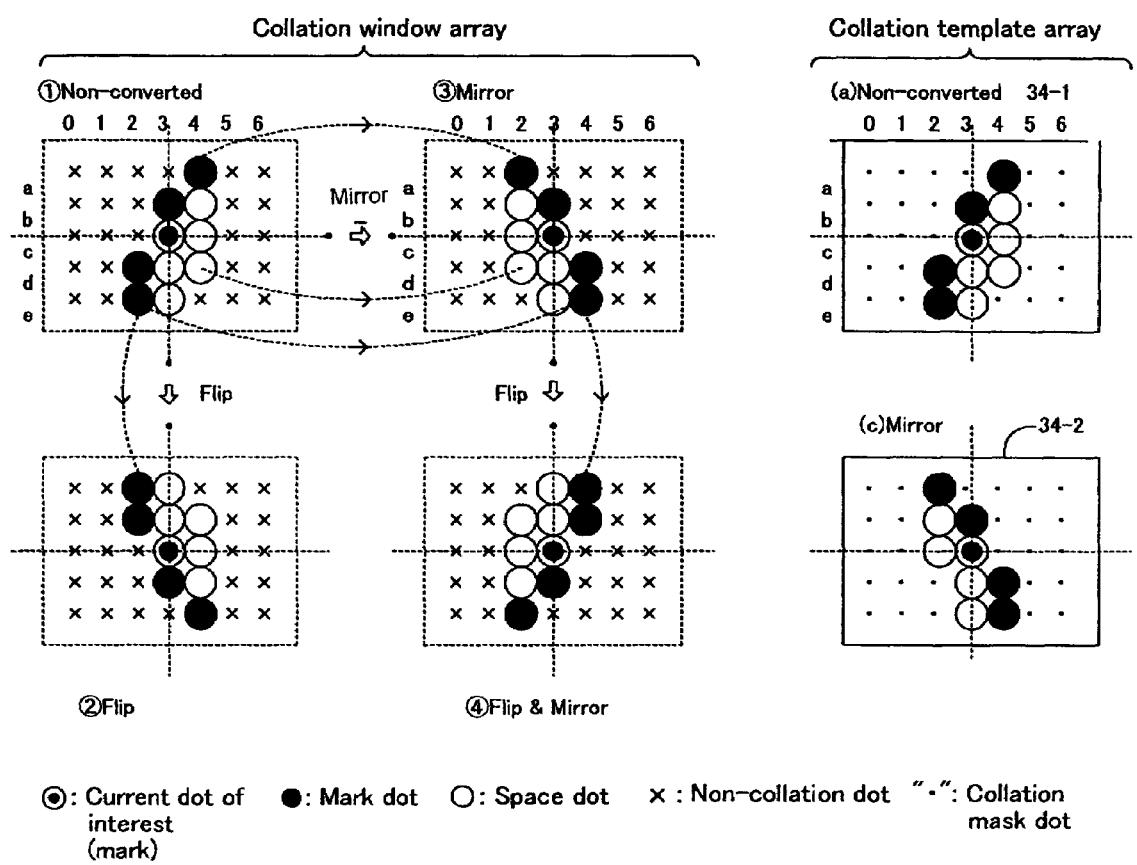
FIG. 8 shows collation templates for discontinuous mark patterns shown in FIG. 7.
Figure 9:
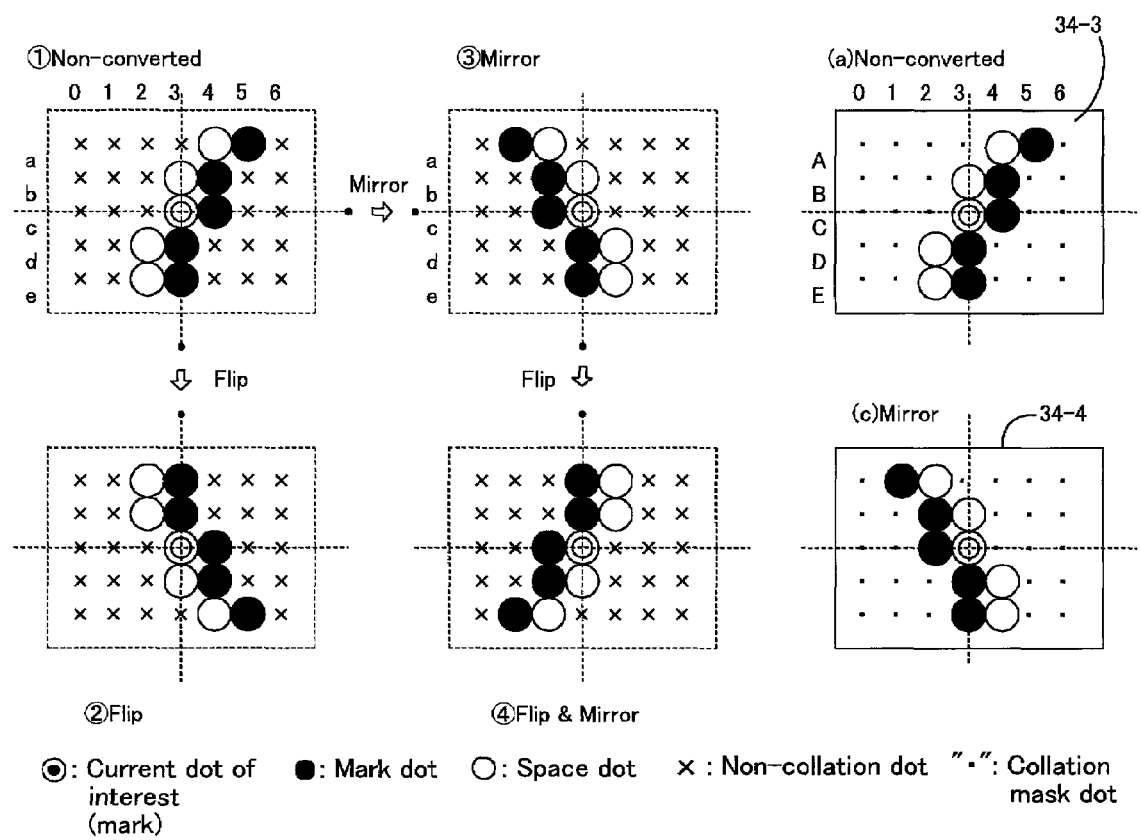
FIG. 9 shows collation templates for discontinuous space patterns shown in FIG. 7.
Figure 10:
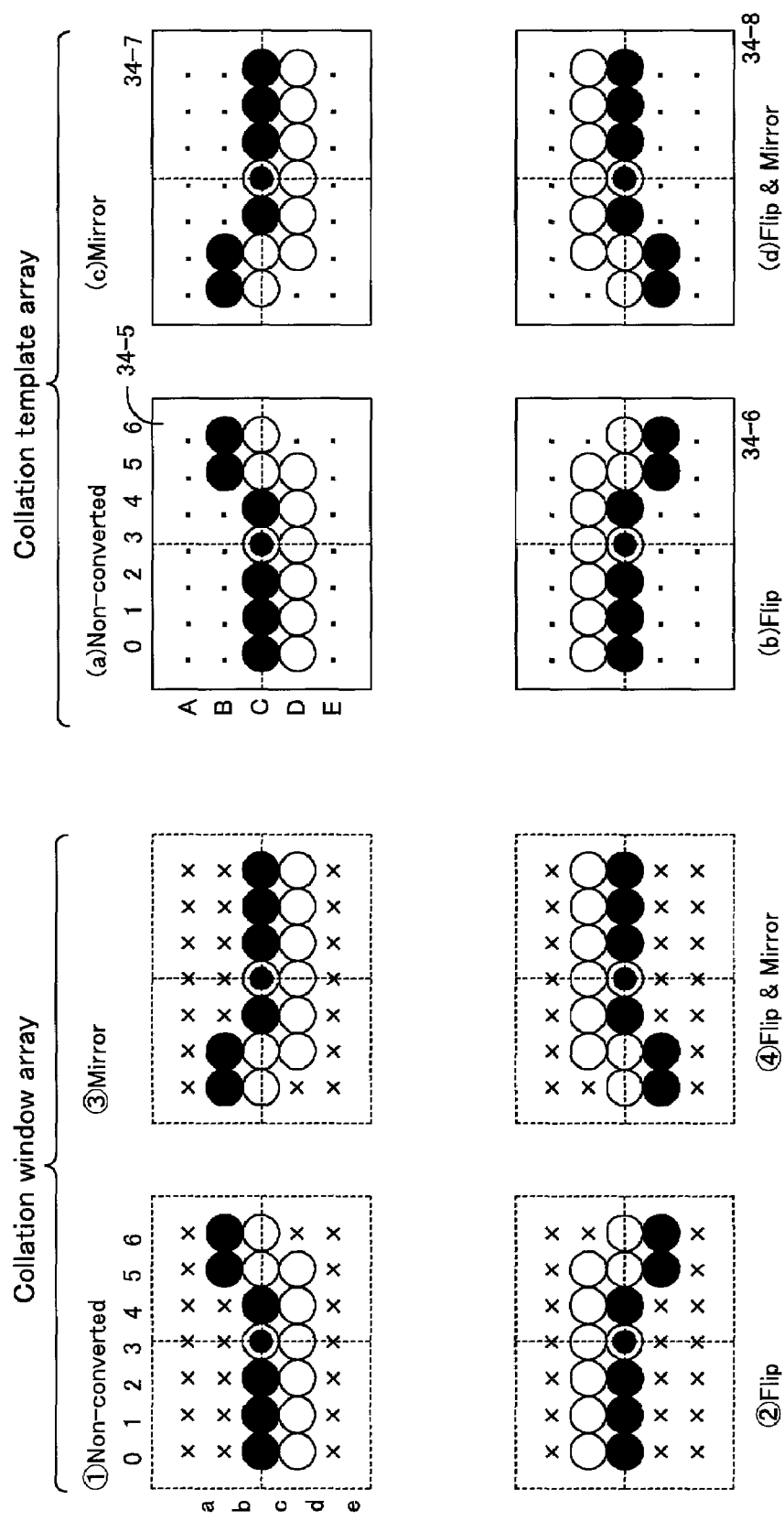
FIG. 10 shows collation templates for continuous mark patterns shown in FIG. 7.
Figure 11:
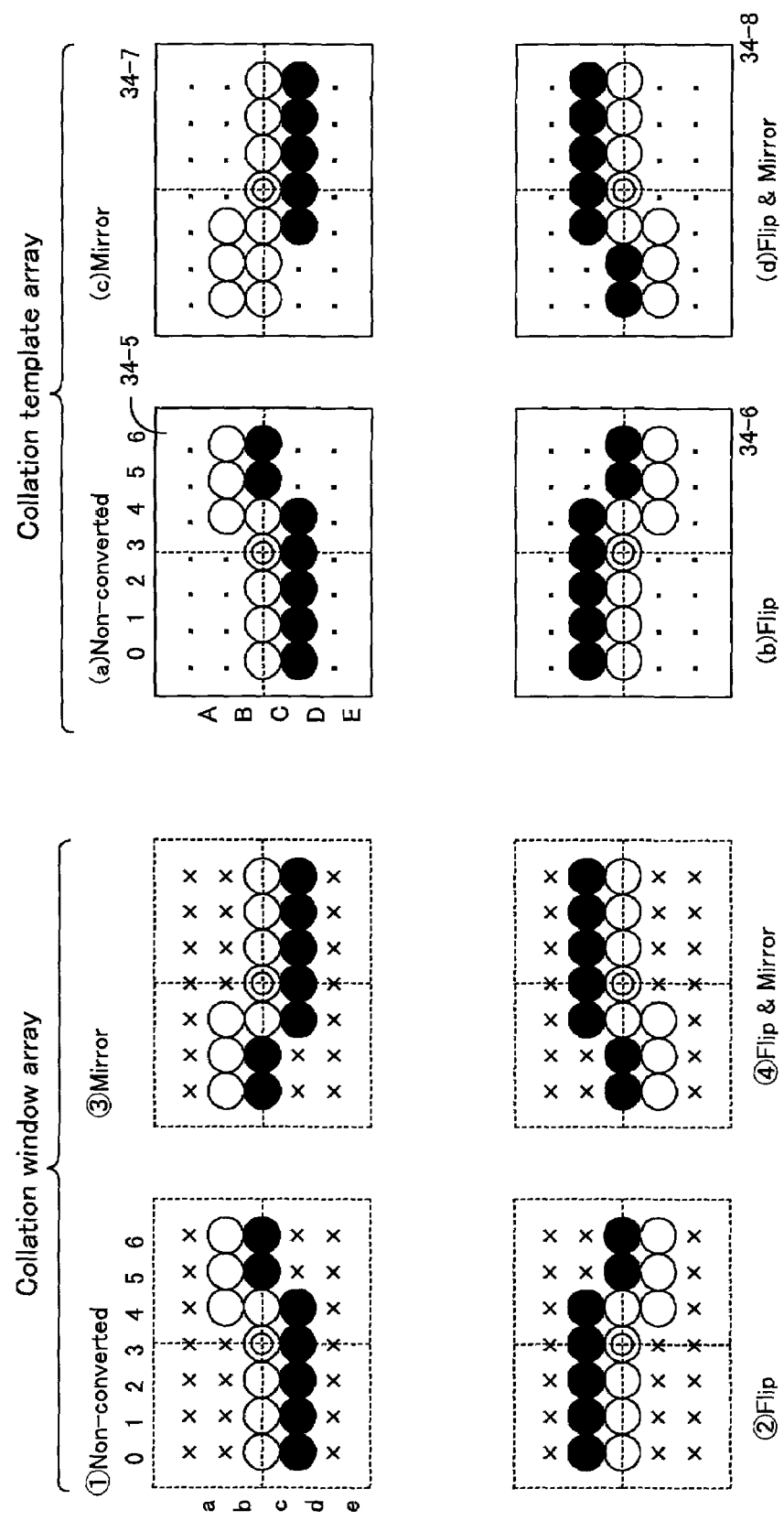
FIG. 11 shows collation templates for continuous space patterns shown in FIG. 7.

Referring to FIG. 8 to FIG. 11, examples of collation template groups 34-1 to 34-8 are explained hereafter. In FIG. 10 and FIG. 11, there are shown examples of arrays of collation template groups 34-5 to 34-8 having continuous pattern in which the current dot of interest and its right and left neighboring dots entirely have mark (●), or else entirely have space (○), in the aforementioned combination. When the continuous pattern is generated, a collation timing signal of continuous pattern becomes active. By this timing signal, simultaneous collation between window output data ① and all four (4) groups of collation patterns 34-5 to 34-8 provided for collating with continuous pattern is executed within one collation cycle time, and the result is transmitted back to pattern collation controller 32.

In FIG. 8 and FIG. 9, there are shown examples of arrays of collation templates 34-1 to 34-4 as discontinuous mark patterns consisting of the current dot of interest having mark (●), and at least either its right or left neighboring dot having space (○). When the discontinuous mark pattern is generated, a collation timing signal of discontinuous mark pattern becomes active. Then, among collation template groups for discontinuous mark patterns, if the right dot of input signal ⑤ from array converter 33 has space (○), then group 34-1 is selected. Else, if the left dot of input signal ⑤ has space (○), then group 34-2 is selected. Else, if both the right and left dots of input signal ⑤ have space (○), then both groups 34-1 and 34-2 are selected. Consequently, simultaneous collation between the input signal ⑤ and the selected collation patterns is executed twice for respective groups 34-1 to 34-4, using 2 collation cycles. The collation result is transmitted back to pattern collation controller 32.

Now, referring to FIG. 12 and FIG. 13, an operation of the configuration shown in FIG. 7 is explained hereafter. Pattern collation controller 32 extracts 5×1 dots (5 rows and 1 column) from image buffer 30 on each window shift timing signal ⑥ deciding collation cycle, to forward to collation window register 31 successively in the latter stage and to output the entire bits (0,a) to (6,e) of output data ① in register 31 to array converter 33. Also, pattern collation controller 32 reads the bit (3,c) positioned at the center of the window array and its left and right neighboring bits (2,c) and (4,c).

Pattern collation controller 32 extracts, on each window shift timing signal ⑥, the current dot of interest (3,c) and its left and right neighboring dots (2,c) and (4,c) from among window output data ①. Depending on this combination, pattern collation controller 32 switches selection signal ⑧ of selectors 37-1 to 37-4 on a time-division basis, to lead to template groups 34-1 to 34-4 collation data ⑤ being converted from window output data ① to a desired array. Also, pattern collation controller 32 outputs pattern collation timing signal to either of template groups 34-1 to 34-8 corresponding to the above-mentioned combination, to order the relevant template group to start collation operation.

In this combination, when the continuous pattern consisting of the current dot of interest and its right and left neighboring dots entirely having mark (●), or else space (○), is generated, a collation timing signal of continuous pattern becomes active. By this timing signal, simultaneous collation between window output data ① and all four (4) groups of collation patterns of 34-5 to 34-8 provided for collating with continuous pattern is executed within one collation cycle time. And the collation result is transmitted back to pattern collation controller 32.

Also, in the combination above, when a discontinuous mark pattern consisting of the current dot of interest having mark (●) and at least either its right or left neighboring dots having space (○) is generated, a collation timing signal of discontinuous mark pattern becomes active. Then, among collation template groups for discontinuous mark patterns, when the right dot of input signal ⑤ from array converter 33 has space (○), then group 34-1 is selected. Else, when the left dot of input signal ⑤ has space (○), then group 34-2 is selected. Else, if both the right dot and the left dot of input signal ⑤ have space (○), then both groups 34-1 and 34-2 are selected. Consequently, input signal ⑤ is simultaneously collated with the selected collation patterns twice for respective groups 34-1 to 34-4, using two (2) collation cycles. The collation result is transmitted back to pattern collation controller 32.

In the above first collation execution, pattern collation controller 32 outputs flip-mode signal 1=OFF, and selectors 37-1 to 37-4 lead non-conversion data ① and mirror-conversion data ③ to respective collation template groups 34-1 to 34-4 to execute collation. In the second collation execution, pattern collation controller 32 outputs flip-mode signal 1=ON, and selectors 37-1 to 37-4 lead flip-conversion data ② and flip-and-mirror-conversion data ④ to respective collation template groups 34-1 to 34-4 to execute collation.

In the above combination, when discontinuous mark patterns having the current dot of interest consisting of space (○) and either its right or left neighboring dot consisting of mark (●) is generated, a collation timing signal of discontinuous space pattern becomes active. Then, among collation template groups for discontinuous space patterns, if the right dot of input signal ⑤ from array converter 33 consists of mark (●), then group 34-3 is selected. Else, if the left dot of input signal ⑤ consists of mark (●), then group 34-4 is selected. Else, if both the right and left dots of input signal ⑤ consist of mark (●), then both groups 34-1 and 34-2 are selected. Consequently, simultaneous collation between the input signal ⑤ and the selected collation patterns is executed twice for respective groups 34-1 to 34-4, using 2 collation cycles. The collation result is transmitted back to pattern collation controller 32.

In the above first collation execution, pattern collation controller 32 outputs flip-mode signal 2=OFF, and selectors 37-1 to 37-4 lead non-conversion data ① and mirror-conversion data ③ to respective collation template groups 34-1 to 34-4 to execute collation. In the second collation execution, pattern collation controller 32 outputs flip-mode signal 2=ON, and selectors 37-1 to 37-4 lead flip-conversion data ② and flip-and-mirror-conversion data ④ to respective collation template groups 34-1 to 34-4 to execute collation.

Pattern collation controller 32 generates dot correction information related to the current dot of interest using the current dot of interest (3,c), the neighboring dots (2,c) and (4,c), and the collation results explained above.

As explained above, according to the present invention, the switch-over of window array converter 33 according to the combinations among the current dot of interest and its right and left neighboring dots, respectively having either mark or space is carried out. The combinations among three dots consisting of the current dot of interest and its right and left neighboring dots are categorized into the following patterns: (1) a continuous pattern of the three dots entirely having mark, or else space; (2) a discontinuous mark pattern including the current dot of interest having mark, excluding the case (1); and (3) a discontinuous space pattern including the current dot of interest having space, excluding the case (1). Template groups are separately allocated on the above category basis, and pattern collations are carried out in parallel for all categories. A processing time of pattern collation for the above-mentioned discontinuous collation pattern groups is assigned at least twice as long as pattern collation time for the continuous collation pattern groups. As a result, in case fast pattern collation is required in such high speed that only a single collation execution time unit can be assigned per collation cycle, a plurality of pattern collation processes can be executed in parallel, using patterns converted from a single template pattern through array conversion means.

Accordingly, in the method described above, it is possible to prevent collation time from being elongated, with the reduced number of templates. For example, in case 512 templates are used for extracting characteristics in contour parts of letters or line drawings, it is sufficient to provide 256 templates for extracting discontinuous patterns and 32 templates for extracting continuous patterns. Thus totally 288 templates are required, reducing to approximately ½ of the conventional method. In terms of collation speed, in the first embodiment, the speed decreases to ¼ compared to the conventional method. In the second embodiment, however, the same collation speed as in the conventional method can be realized.

Moreover, according to the present invention, a plurality of pattern collation operations becomes possible in one collation cycle in the following manner: among combinations of the current dot of interest and its right and left neighboring dots in an output data of a window, when the current dot of interest and its right and left neighboring dots entirely have mark, or else space, pattern collation using a template group corresponding to a continuous pattern is started; when the current dot of interest has mark and at least either its right or left neighboring dot has space, pattern collation using a template group corresponding to a discontinuous mark pattern is started; and, when the current dot of interest has space and at least either its right or left neighboring dot has mark, the pattern collation using a template group corresponding to a discontinuous space pattern is started.

Now, referring to FIG. 14 to FIG. 18, there are explained configuration examples of collation templates 34 shown in FIG. 2 and FIG. 7, and pattern collation controller 32 are explained hereafter.

Figure 14:
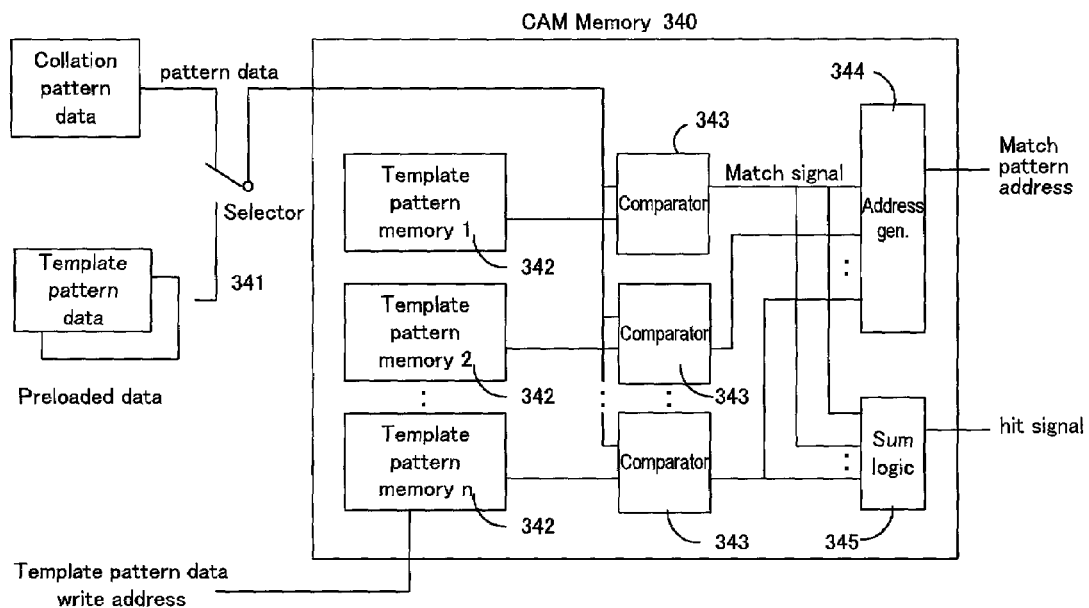
FIG. 14 shows a collation template circuit of the configuration shown in FIG. 7.

In FIG. 14, a configuration diagram of collation templates 34 is shown. Collation template 34 consists of a content addressable memory (CAM) 340. Compared to an ordinary RAM (random access memory) having a function of outputting data stored in the address specified by an input, CAM 340 compares an input data with each internally stored data for all addresses and, on detection of a stored data matched with the input data, output an address having a matched data, as well as a matching signal (hit signal). The content addressable memory is suitable for use of high-speed retrieval.

Accordingly, as shown in FIG. 14, desired template patterns are stored in an internal memory 342 in write mode through a selector 341. In pattern matching mode, a data to be referred to is input to a comparator 343 through selector 341, to execute parallel collation with internal memory 342. A matched result is obtained from an address generator 344 and a logical-OR circuit 345.

For example, in case a single CAM 340 can store 32 sets of template patterns, collation template groups 34 are constituted by a plurality of CAM 340 of which number totals to the required template number divided by 32.

Figure 15:
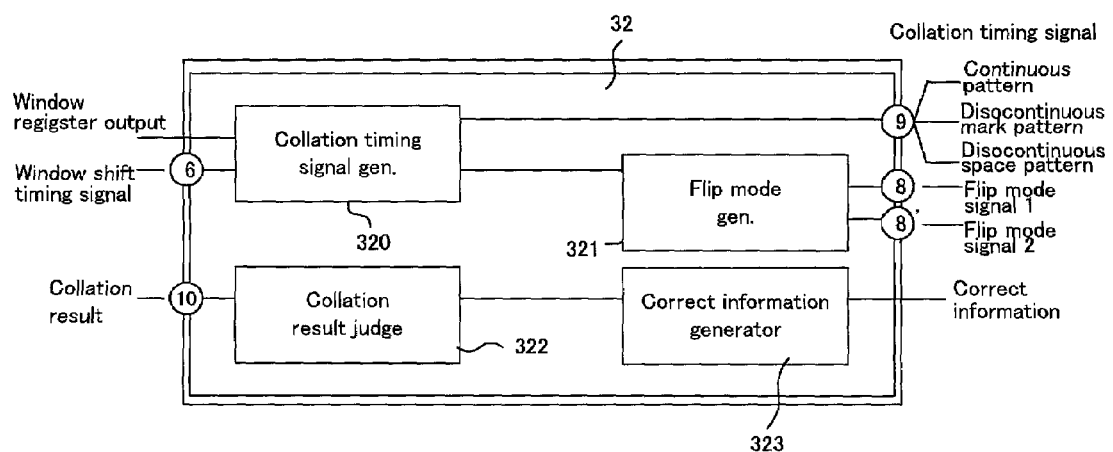
FIG. 15 shows a configuration diagram of the pattern collation controller of the configuration shown in FIG. 7.

Now, referring to FIG. 15 to FIG. 18, pattern collation controller 32 shown in FIG. 7 is explained hereafter. As shown in FIG. 15, pattern collation controller 32 consists of collation timing generator 320, flip-mode signal generator 321, collation result comparator 322 and correction information generator 323.

Figure 16:
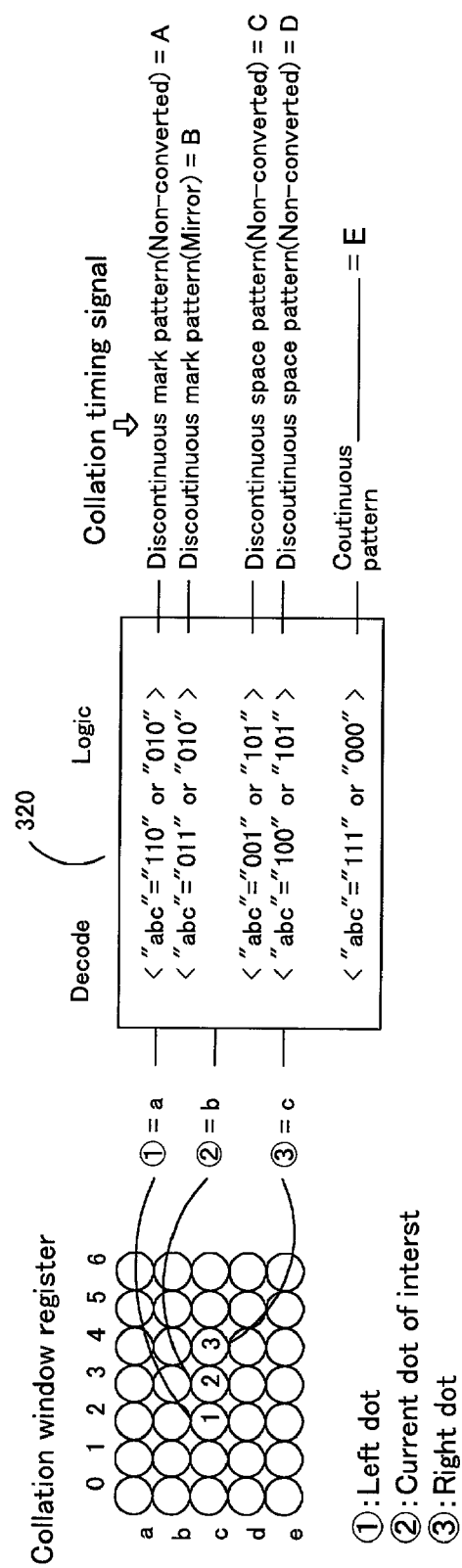
FIG. 16 shows a configuration diagram of collation timing signal generator shown in FIG. 15.
Figure 17:
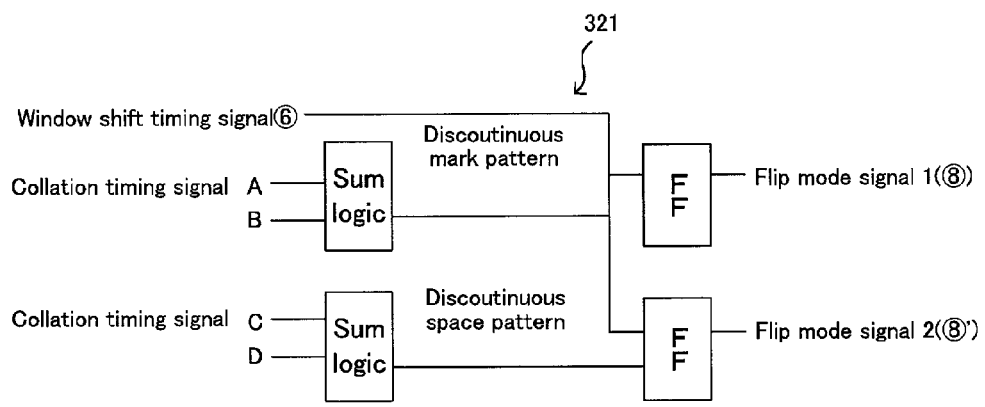
FIG. 17 shows a configuration diagram of flip-mode signal generator shown in FIG. 15.
Figure 18:
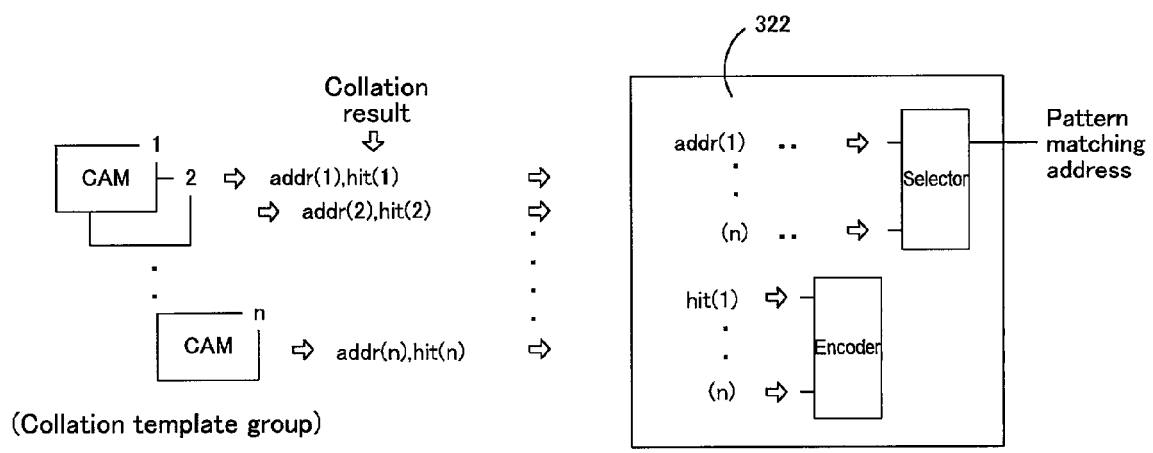
FIG. 18 shows a configuration diagram of collation result decision circuit shown in FIG. 15.
Figure 19:
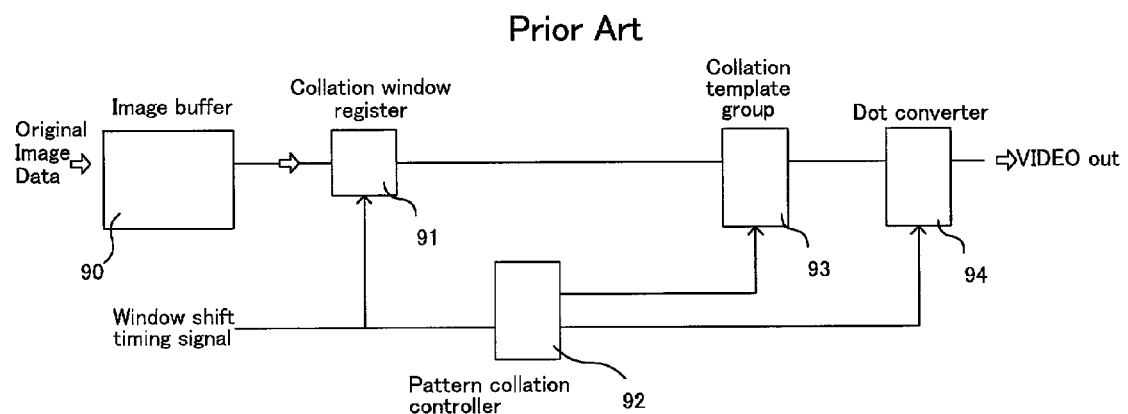
FIG. 19 shows a configuration of conventional image processing equipment.
Figure 20:
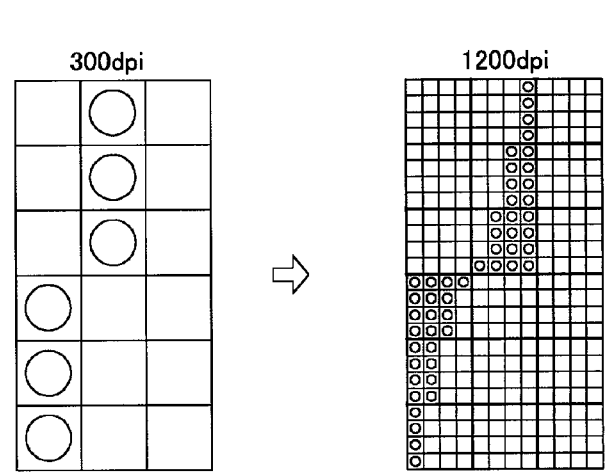
FIG. 20 shows an example of image enhancement using a conventional image processing.

As shown in FIG. 16, collation timing generator 320 decodes the current dot of interest and the both neighboring dots using five (5) decoders, to generate pattern collation timing signals A, B, C, D and E. Flip-mode signal generator 321 generates flip-mode signal 1 and 2 from collation timing signals A, B, C and D, as shown in FIG. 17. Also, as shown in FIG. 18, a pattern matching address is generated from collation information (i.e. address and hit signal) forwarded from each CAM 340. Correction information generator 323 generates correction information according to the pattern matching address. The above correction information includes substitution pattern address for converting the current dot of interest to a high-density dot pattern shown in FIG. 6.

According to the present invention, a converted image data in a collation window through mirror-conversion, flip-conversion, and flip-and-mirror-conversion is selected on a time-division basis to collate with a single template pattern, which produces the same effect as the case of providing maximum four (4) templates. Thus the number of required templates can be greatly reduced. Moreover, by utilizing an area produced after the above reduction of templates for adding new patterns, more sophisticated image enhancement effect can be realized.

According to the invention, a pattern collation processing time using discontinuous collation pattern groups is allocated at least twice as long as the time for processing using continuous collation pattern groups. In case fast pattern collation is required in such high speed that only a single collation time unit can be assigned per collation cycle, a plurality of pattern collations can be executed in a collation cycle, using template patterns obtained from a single template pattern through an array conversion means.

The foregoing description of the embodiments is not intended to limit the invention to the particular details of the examples illustrated. Any suitable modification and equivalents may be resorted to the scope of the invention. All features and advantages of the invention that fall within the scope of the invention are covered by the appended claims.

What is claimed is:

1. An image processing apparatus for performing correction, the image processing apparatus comprising:
   a plurality of templates;
   a window array conversion unit that converts a data array of output data from an M×N window extracted from input data to a plurality of array conversion data patterns;
   a pattern collation unit that collates the array conversion data pattern converted by the window array conversion unit with at least one of the templates, each of the templates including reference patterns; and
   a pattern collation control unit that switches between the array conversion data patterns to collate with the template,
   wherein the pattern collation control unit selects at least one of the templates based on a combination of mark dots and space dots from among a current dot of interest and its neighboring dots in the output data from the window; and
   wherein the combination includes:
   (a) a first template group of a continuous pattern consisting of three dots entirely having mark, or space;
   (b) a second template group of a discontinuous mark pattern consisting of the current dot of interest having mark, excluding the template group (a); and
   (c) a third template group of a discontinuous space pattern consisting of the current dot of interest having space, excluding said template group (a).

2. The image processing apparatus according to claim 1, wherein the pattern collation control unit starts collation with the first template group when the current dot of interest and its right and left neighboring dots entirely have mark, or space;
   the pattern collation control unit starts collation with the second template group when the current dot of interest has mark, and at least either its right or left neighboring dot has space; and
   the pattern collation control unit starts collation with the third template group when the current dot of interest has space, and at least either its right or left neighboring dot has mark.

3. An image processing method for performing correction comprising:
   converting a data array of output data from an M×N window extracted from input data to a plurality of array conversion data patterns;
   collating the array conversion data pattern converted with at least one of a plurality of templates, each of the templates including reference patterns; and
   switching between the array conversion data pattern to collate with the template,
   wherein the template is selected based on a combination of mark dots and space dots from among a current dot of interest and its neighboring dots in the output data from the window; and
   wherein the combination includes:
   (a) a first template group of a continuous pattern consisting of three dots entirely having mark, or space;
   (b) a second template group of a discontinuous mark pattern consisting of the current dot of interest having mark, excluding the template group (a); and
   (c) a third template group of a discontinuous space pattern consisting of the current dot of interest having space, excluding said template group (a).

4. The image processing method according to claim 3, wherein a process of the collating starts collation with the first template group when the current dot of interest and its right and left neighboring dots entirely have mark, or space;
   the process of collating starts collation with the second template group when the current dot of interest has mark, and at least either its right or left neighboring dot has space; and
   the process of collating starts collation with the third template group when the current dot of interest has space, and at least either its right or left neighboring dot has mark.

5. A storage medium readable by a computer, the storage medium storing a program of instructions executable by the computer to perform a function for image processing, the function comprising:
   converting a data array of output data from an M×N window extracted from input data to a plurality of array conversion data patterns;
   collating the array conversion data pattern with at least one of a plurality of templates, each of the templates including reference patterns; and
   switching between the array conversion data patterns to collate with the template,
   wherein the template is selected based on a combination of mark dots and space dots from among a current dot of interest and its neighboring dots in the output data from the window; and
   wherein the combination includes:
   (a) a first template group of a continuous pattern consisting of three dots, entirely having mark, or space;
   (b) a second template group of a discontinuous mark pattern consisting of the current dot of interest having mark, excluding the template group (a); and (c) a third template group of a discontinuous space pattern consisting of the current dot of interest having space, excluding said template group (a).

6. The storage medium according to claim 5,
wherein a process of collating starts collation with the first template group when the current dot of interest and its right and left neighboring dots entirely have mark or space;

the process of collating starts collation with the second template group when the current dot of interest has mark, and at least either its right or left neighboring dot has space; and the process of collating starts collation with the third template group when the current dot of interest has space, and at least either its right or left neighboring dot has mark.

7. The image processing apparatus for performing correction, the image processing apparatus comprising:
a plurality of templates;
a window array conversion unit that converts a data array of output data from an M×N window extracted from input data to a plurality of array conversion data patterns;
a pattern collation unit that collates the array conversion data pattern converted by the window array conversion unit with at least one of the templates, each of the templates including reference patterns; and
a pattern collation control unit that switches between the array conversion data patterns to collate with the template based on a time-division and selects at least one of the templates based on a combination of mark dots and space dots from among a current dot of interest and its neighboring dots in the output data from the window, wherein the combination includes (a) a first template group of a continuous mark pattern consisting of three dots entirely having mark, or space;

(b) a second template group of a discontinuous mark pattern consisting of the current dot of interest having mark, excluding the template group (a); and (c) third template group of a discontinuous space pattern consisting of the current dot of interest having space, excluding said template group (a), and the plurality of templates being classified by the template groups and a plurality of process of the pattern collation unit being performed in parallel based on the template groups.

* * * * *